United States Patent
Antani et al.

(10) Patent No.: US 9,665,394 B2
(45) Date of Patent: May 30, 2017

(54) SHARING APPLICATION OBJECTS AMONG MULTIPLE TENANTS

(71) Applicant: INTERNATIONAL BUSINESS MACHINES CORPORATION, Armonk, NY (US)

(72) Inventors: Snehal S. Antani, Hyde Park, NY (US); Junjie Cai, Cary, NC (US); Jia Fei, Shanghai (CN); Wei Wei Gao, Shanghai (CN); Heng Wang, Shanghai (CN); Yan R. Wu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 14/221,812

(22) Filed: Mar. 21, 2014

(65) Prior Publication Data
US 2014/0297751 A1    Oct. 2, 2014

(30) Foreign Application Priority Data

Mar. 29, 2013 (CN) .......................... 2013 1 0108987

(51) Int. Cl.
*G06F 15/16* (2006.01)
*G06F 9/46* (2006.01)

(52) U.S. Cl.
CPC ................................... *G06F 9/468* (2013.01)

(58) Field of Classification Search
CPC ..... G06F 9/455; G06F 17/30607; H04L 67/10
See application file for complete search history.

(56) References Cited

U.S. PATENT DOCUMENTS

| | | | | |
|---|---|---|---|---|
| 6,519,594 B1* | 2/2003 | Li | ........................ | G06F 9/44563 707/704 |
| 2003/0097360 A1* | 5/2003 | McGuire | .................... | G06F 9/52 |
| 2005/0086237 A1* | 4/2005 | Monnie | .................... | G06F 9/544 |
| 2006/0026200 A1* | 2/2006 | Cabillic | .............. | G06F 9/30174 |
| 2012/0023107 A1* | 1/2012 | Nachnani | .......... | G06F 17/30303 707/748 |
| 2012/0151495 A1* | 6/2012 | Burckhardt | ............. | G06F 9/485 718/106 |
| 2012/0203800 A1* | 8/2012 | Wu | ...................... | G06F 21/6209 707/784 |
| 2014/0040860 A1* | 2/2014 | Darcy | ..................... | G06F 8/437 717/114 |
| 2015/0128147 A1* | 5/2015 | Holt | .................... | G06F 12/0253 718/104 |

OTHER PUBLICATIONS

IBM, "System and Method for Shared Memory/File System Java ObjectGroups in Clustered JVM", 2004, IP.com, pp. 1-4.*
IBM, "System and Method for Shared Memory/File System Java Objectgroups in Clustered JVM", ip.com, IPCOM000021597D, Jan. 26, 2004, pp. 1-4.

* cited by examiner

*Primary Examiner* — Sargon Nano
*Assistant Examiner* — Kidest Mendaye
(74) *Attorney, Agent, or Firm* — Law Office of Jim Boice

(57) ABSTRACT

The present invention discloses a method and system for sharing application objects among multiple tenants, wherein the method comprises: identifying objects that can be shared by multiple tenants; merging the objects that can be shared by the multiple tenants; and updating references of the tenants to the shared objects prior to the merging so as to cause the references to point at a merged shared object. The method of the present invention enables the tenants to share application data more efficiently.

16 Claims, 5 Drawing Sheets

SHARING APPLICATION OBJECTS AMONG MULTIPLE TENANTS

BACKGROUND

The present invention relates to an information processing method and system, and more specifically, relates to a method and system for sharing application objects among multiple tenants.

The Multi-tenancy technology is a technology enabling multiple tenants running on a same Java virtual machine (JVM) to share JVM resources. However, some existing multi-tenancy technologies, for example, a multi-tenant Java virtual machine (Multitenant JVM), allow multiple tenants to share some resources of the virtual machine (for example, optimization results of a compiler) and system class library memory images. Some other technologies support the sharing of all static data for applications among multiple tenants by default. If some static data are specific to a tenant and cannot be shared, the developers need to explicitly identify them in a program with Java annotations. It also means that when a traditional application is translated into a multi-tenant application, the developers have to discriminate all data that need to be isolated among tenants, which is a time-consuming and troublesome process.

Therefore, there is a need for a method or system capable of enabling application data to be shared more efficiently among multiple tenants.

SUMMARY

According to an aspect of the present invention, there is provided a method for sharing application objects among multiple tenants, the method comprising: identifying objects that can be shared by the multiple tenants; merging the objects that can be shared by the multiple tenants; and updating references of the tenants to the shared objects prior to the merging so as to cause the references to point at a merged shared object.

According to another aspect of the present invention, there is provided a system for sharing application objects among multiple tenants, the system comprising: an identifying device configured to identify objects that can be shared by the multiple tenants; a merging device configured to merge the objects that can be shared by the multiple tenants; and a reference updating device configured to update references of the tenants to the shared objects prior to the merging so as to cause the references to point at a merged shared object.

Various embodiments of the present invention are transparent to the tenants' applications, can automatically identify the objects that can be shared in the multiple tenants' applications and merge them, which can effectively save memory, thereby more effectively enabling the tenants to share application data.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
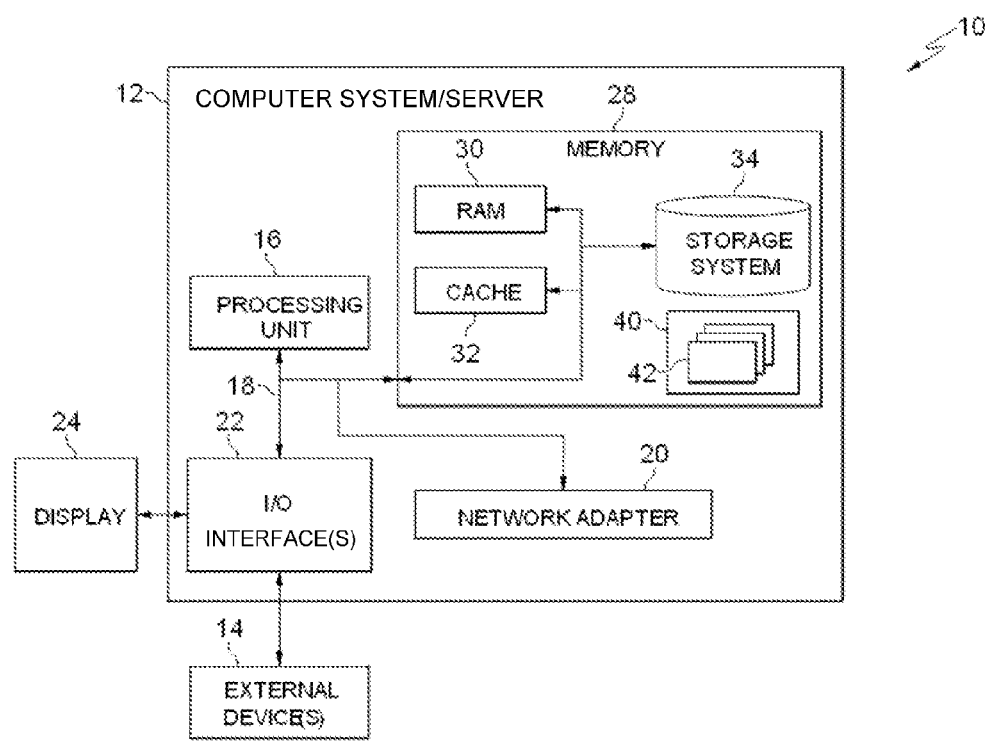
FIG. 1 shows a block diagram of an exemplary computer system/server 12 which is applicable to implement the exemplary embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Note that in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is represented in the form of a general-purpose computing device. The components of computer system/server 12 may include, but are not limited to, one or more processors or processing units 16, a system memory 28, and a bus 18 that couples various system components, including system memory 28 and processing unit 16.

Bus 18 represents one or more of several types of bus structures, including a memory bus or memory controller, a peripheral bus, an accelerated graphics port, and a processor or local bus using any of a variety of bus architectures. By way of example, and without limitation, such architectures include Industry Standard Architecture (ISA) bus, Micro Channel Architecture (MAC) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example. Such program modules 42 include, but are not limited to an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
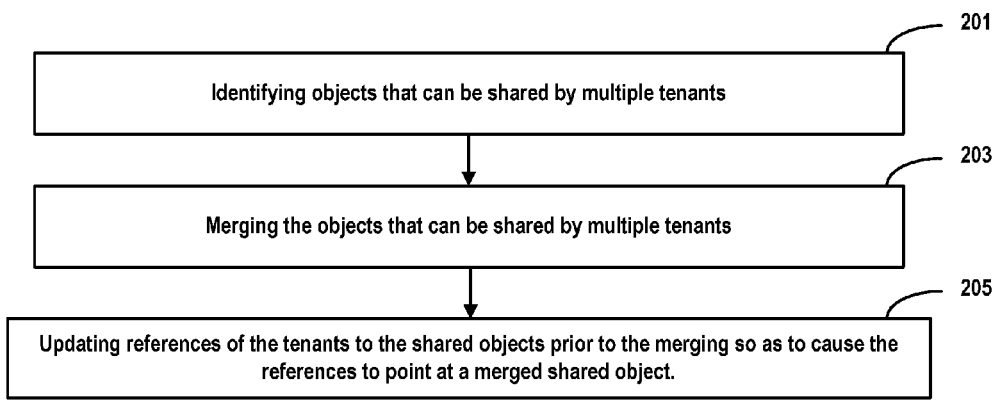
FIG. 2 and FIG. 3 show a first specific embodiment of a method for sharing application objects among multiple tenants according to the present invention.
Figure 3:
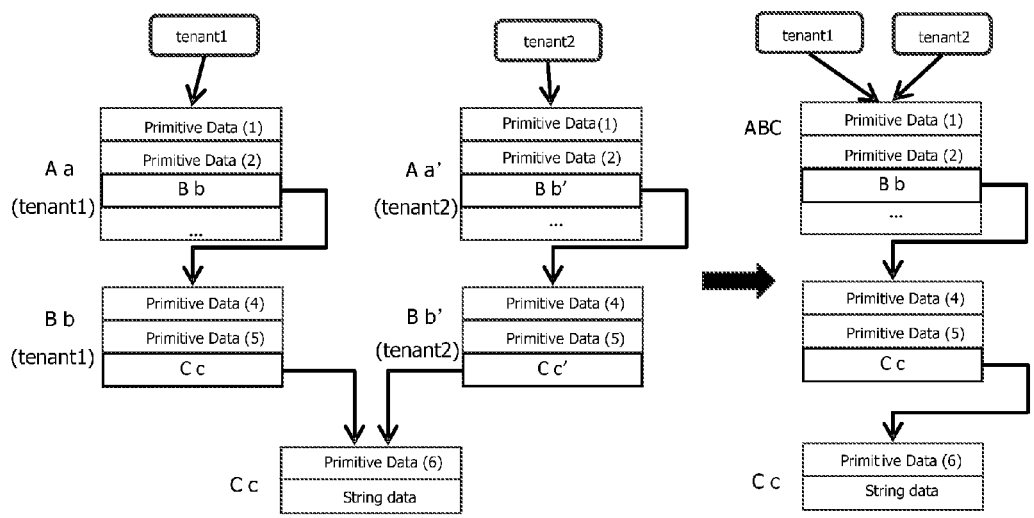

With reference now to FIG. 2 and FIG. 3, in which a first specific embodiment of a method for sharing application objects among multiple tenants according to the present invention is shown. In step 201, objects that can be shared by multiple tenants are identified, wherein the objects that can be shared by multiple tenants are those belonging to a same class and whose primitive-like type fields have identical contents but belonging to different tenants. The primitive-like type fields include at least one of the following: primitive data (for example, int, float, char, etc.), an array of primitive data (for example, int[], float[], char[], etc.), a package class of primitive data (for example, Integer, Float, etc.), an array of package classes (for example, Integer[], Float[], etc.), an invariable object (for example, String, etc.). FIG. 3 shows that tenant 1 and tenant 2 directly or indirectly refer to objects (Aa, Bb, Cc) and objects (Aa', Bb', Cc'), respectively, wherein the objects (Aa, Bb, Cc) and objects (Aa', Bb', Cc') mainly include primitive-like type fields, and complex reference type fields (for example, in Aa, there is a complex reference pointer Bb, and in Bb, there is a complex reference pointer Cc); besides, the objects in each group of (Aa, Aa'), (Bb, Bb') and (Cc, Cc') belong to the same class. The explanation of the complex reference type fields will be detailed below. Of course, those skilled in the art may also contemplate any other primitive types based on the present application. Preferably, within a sufficiently long time, those primitive-like type fields of the objects that can be shared by multiple tenants remain constant. The sufficiently long time can be selected according to actual requirements by those skilled in the art as a plurality of garbage collection (GC) time periods for the Java virtual machine. In step 203, the objects that can be shared by multiple tenants are merged. After identifying a plurality of objects that can be shared by multiple tenants, these objects can be compared one by one. After identical objects are found, these objects may be merged. As to how to determine whether these objects are identical and how to merge the objects, they will be described in a plurality of preferred specific embodiments hereinafter. The merged object is for example an object ABC as shown in FIG. 3. In step 205, the references of the tenants to the shared objects prior to the merging are updated, such that the references can point at the merged shared object. As shown in FIG. 3, the references of tenants 1, 2 are changed from originally pointing at objects Aa and Aa' to pointing at the merged shared object ABC.

Figure 4:
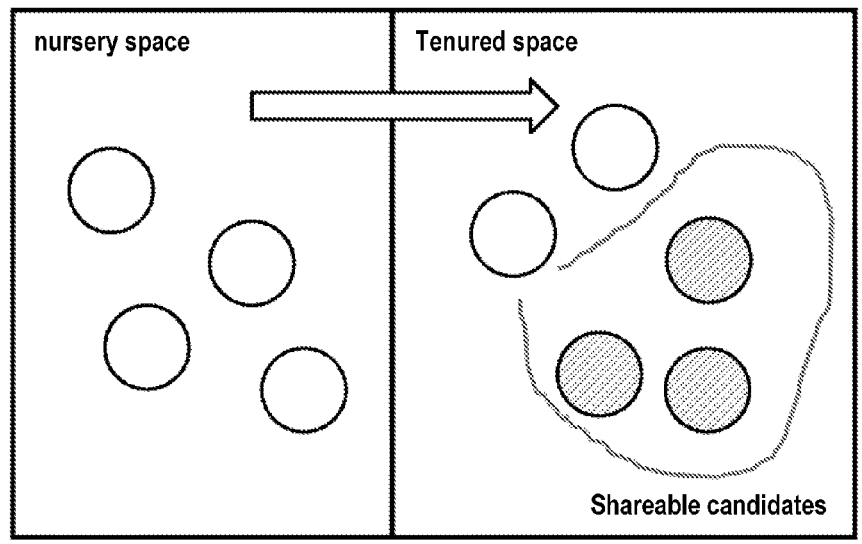
FIG. 4 shows filtering out candidate objects that can be shared by multiple tenants from among heap objects of a Java virtual machine.

Preferably, another aspect of the present invention may further comprise filtering out in advance candidate objects that can be shared by multiple tenants from among heap objects of the Java virtual machine as shown in FIG. 4. The method may divide Java heap memory into a nursery space and a tenured space. When a new object is created (in the nursery space), it will be marked by default as being non-sharable. A precondition for an object to potentially become a sharable candidate object is that the object experiences enough garbage collection cycles (for example, two or more garbage collection cycles) to move from the nursery space to the tenured space. In the tenured space, those objects mainly composed of primitive-like type fields that were not modified during a certain period of time will be regarded as sharable candidate objects, which are then marked as being sharable. Generally speaking, primitive types comprise 8 kinds of built-in types in the Java language as follows: boolean, char, byte, short, int, long, float, and double. Reference types are those types that may create objects with new. The Java language only has primitive types and reference types. Among the reference types, except for some simple reference types included in the primitive-like types, such as array of primitive data, package class of the primitive data, array of package classes, and invariable objects, the remaining types are referred to as "complex reference types," for example, Foo foo (some class references); Foo [] fooArr (some array references), etc., wherein the primitive-like type fields comprise primate type fields. The specific proportion for the above mentioned "mainly" is specifically prescribed by those skilled in the art in specific implementations according to actual requirements. For example, if an object has 10 fields, while 6 fields belong to the primitive-like type fields, it may be deemed that the requirement of "mainly" is satisfied. The process of filtering out sharable candidate objects may be specifically implemented in combination of a global GC: first, all new objects are marked as being non-sharable (which may be implemented by adding a sharing flag bit in an object structure or by maintaining the set of all non-sharable or sharable objects in the data structure of the GC). In a global GC, it is checked whether there are objects marked as being sharable in the last GC, and then from among these objects, it is judged whether an object is a sharable candidate object based on whether the lifetime of the object (which is generally maintained by the GC) exceeds a threshold, and then all objects in the tenured space are marked as being sharable. For example, between two global GCs, if an object's primitive-like type fields are updated, then the object is marked as being non-sharable. This process may be implemented by a method of modifying a Java bytecode instruction putfield. Modifying the object field will execute the Java bytecode instruction putfield. The method judges whether the field type to be modified is a primitive-like type field, if so, the object will be marked as being non-sharable. Of course, those skilled in the art may conceive of more specific implementations of filtering out sharable candidate objects based on the present application, which will not be detailed here.

Figure 5:
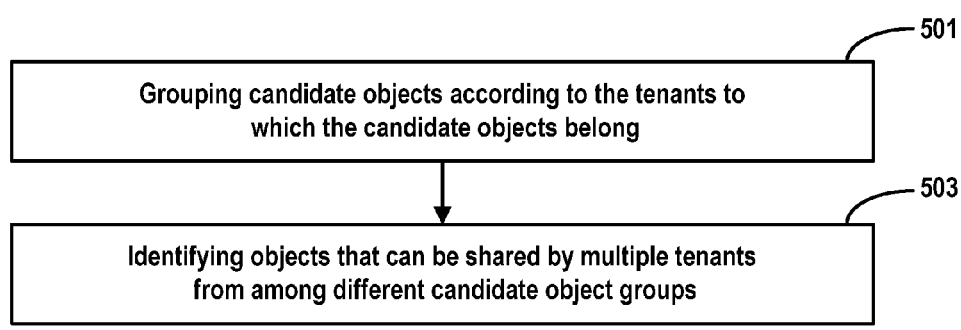
FIG. 5 shows a specific embodiment of identifying objects that can be shared by multiple tenants according to the present invention.

FIG. 5 shows a specific embodiment of identifying objects that can be shared by multiple tenants according to the present invention. In step 501, the candidate objects are grouped according to the tenants to which the candidate objects belong. Because the candidate objects belong to different tenants, respectively, the object comparing process can be greatly expedited by grouping respective candidate objects as per tenant. In step 503, the objects that can be shared by multiple tenants are identified from different candidate object groups, wherein two or more objects can be merged and shared by different tenants, with a precondition that the two objects are identical. Therefore, preferably, identifying the objects that can be shared by multiple tenants may be performed through the following method: comparing the classes to which the objects in different candidate object groups belong with the values of their primitive-like type fields to determine whether the classes and the values of the primitive-like type fields are identical; and in response to the belonged classes and the values of the primitive-like type fields being identical, determining that these objects are the objects that can be shared by multiple tenants. Preferably, identifying the objects that can be shared by multiple tenants may also be performed through the following method: comparing hash values of the objects in different candidate object groups, wherein the hash values are obtained from the calculation based on the classes to which the objects belong and all primitive-like type field values, and are pre-stored in the object structure; and in response to the hash values of the objects in the different candidate object groups being identical, determining that these objects are the objects that can be shared by multiple tenants. By comparing the hash values, the objects that can be shared may be identified much faster. Those skilled in the art know that the hash values of the objects may be calculated through a plurality of methods, for example, MD5 and SHA-1 algorithms and the like which are well known to those skilled in the art.

Figure 6:
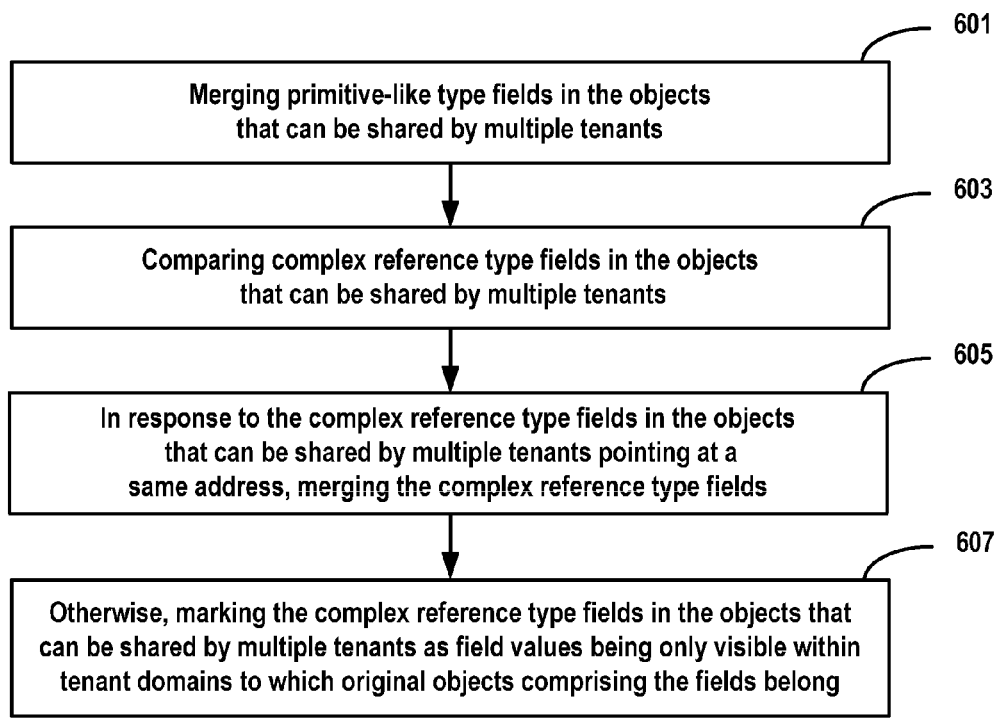
FIG. 6 shows a specific embodiment of merging objects that can be shared by multiple tenants according to the present invention.

FIG. 6 shows a specific embodiment for merging objects that can be shared by multiple tenants according to the present invention. In step 601, primitive-like type fields in the objects that can be shared by multiple tenants are merged. For primitive-like type fields, the merging can be performed directly. In step 603, complex reference type fields in the objects that can be shared by multiple tenants are compared. In step 605, in response to the complex reference type fields in the objects that can be shared by multiple tenants pointing at a same address, the complex reference type fields are merged, and in step 607, otherwise, the complex reference type fields in the objects that can be shared by multiple tenants are marked such that the field values are only visible within tenant domains to which the original objects comprising the fields belong. Since the complex reference type fields are relatively complex and the object referring depths of some tenants are relatively deeper, it may be considered now to set a program switch to decide whether it is required to compare the complex reference type fields; and when a user needs to compare the complex reference type fields and the objects pointed at by the references, a maximum reference depth for comparison may be set. In this way, within the maximum depth as set by the user, the reference type fields pointing at the same address will be merged along a reference chain of the objects. If the reference type fields of the objects cannot be merged in the last step, then the fields are marked such that the field values are only visible within the belonged tenant domains. This limitation may be implemented by modifying the Java bytecode instructions getfield and putfield according to particular implementation as: (1) marking a field as being visible only within a tenant domain (a flag bit may be added in the data structure of a descriptive field within the JVM to indicate whether the field is only visible to the tenant domain); when the field is accessed for the first time, the JVM will allocate a global index for accessing the field (the index is identical to all tenants); (2) modifying getfield: if the field to be read is a field only visible within the tenant domain, then based on the current tenant information (the current tenant information may be stored in a variant similar to ThreadLocal, and the variant may be used to indicate to which tenant the current thread belongs), reading the content in the field corresponding to the current version of tenant, i.e., each tenant has its own independent data area, such that when the content of a field is read, the field index is first retrieved, and then the data area corresponding to the tenant is searched for the content of the field via the index and the current tenant information; (3) modifying putfield: if the field to be updated is a field only visible to the tenant domain, then based on the current tenant information, the content of the field corresponding to the current version of tenant is updated, i.e., a field index is retrieved, and according to the field index, the content of the field is written into the data area of the tenant.

Figure 7:
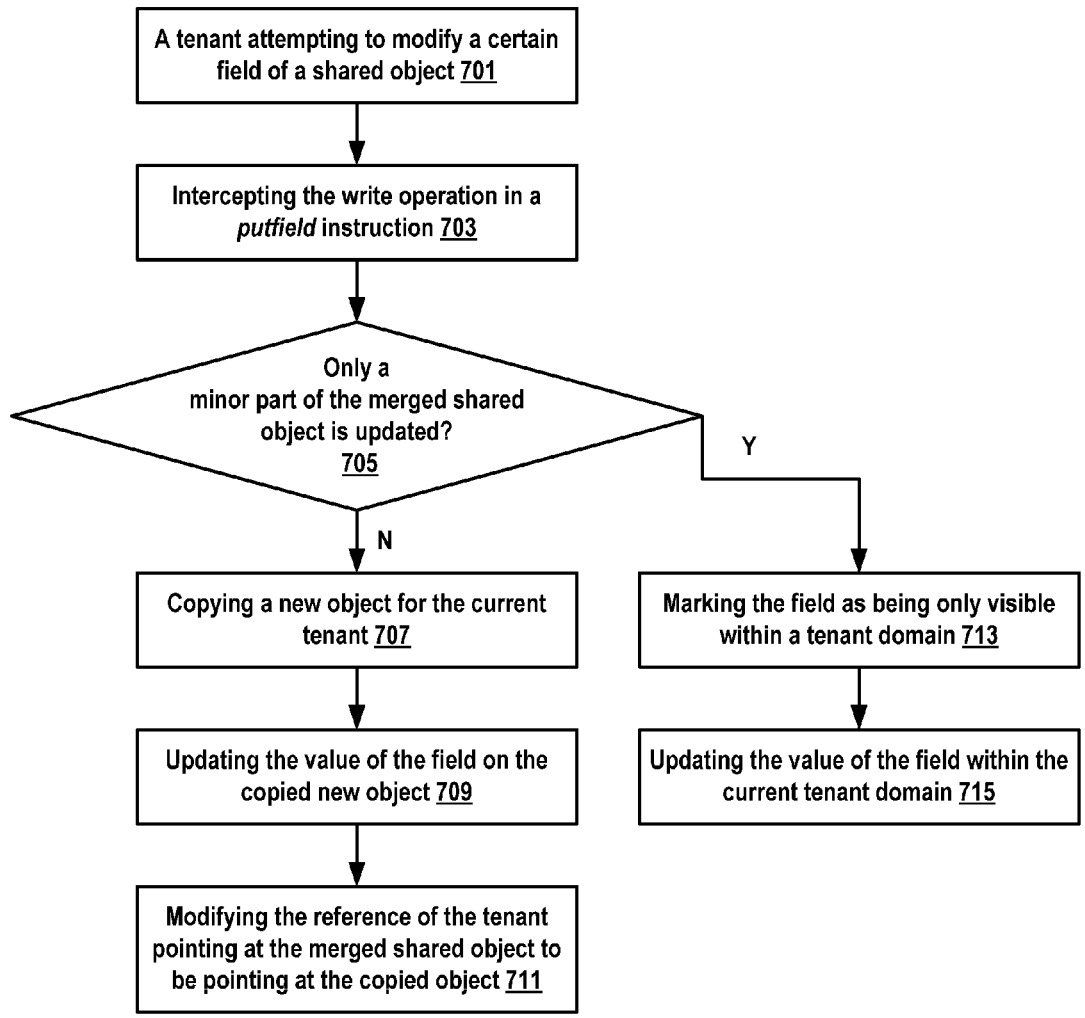
FIG. 7 shows a specific embodiment of processing shared objects that have been modified and merged by tenants.

For the merged shared object, a tenant might also modify it sometimes. If the tenant attempts to modify most fields of the merged shared object, then in response to the tenant modifying most fields of the merged shared object, a new object is copied according to the merged shared object; and the values of the most fields of the copied object are updated; and the pointer of the tenant pointing at the merged shared object is changed to be pointing at the copied object, wherein those skilled in the art may determine the amount of modification that may be regarded as modifying most fields according to specific actual requirements. For example, an object has 10 fields. If the tenant modifies more than 5 fields, it may be deemed as modifying most fields, while modifying 5 fields or below, it may be deemed as modifying minor fields. FIG. 7 shows a more complex specific embodiment for processing a scenario in which a tenant modifies a merged shared object according to the present invention. In step 701, the tenant attempts to modify a certain field of a shared object. In step 703, the write operation is intercepted in a bytecode instruction putfield of the JVM. In step 705, it is determined whether the merged shared object only has a minor part of fields updated. If not, in step 707, a new object is copied for the current tenant, and in step 709, the value of the field is updated on the copied new object; and finally, in step 711, the reference of the tenant pointing at the merged shared object is changed to be pointing at the copied object. If the determination result in the determining step 705 is yes, then in step 713, the field is marked as being visible only within the tenant domain, and in step 715, the value of the field is updated within the current tenant domain.

Figure 8:
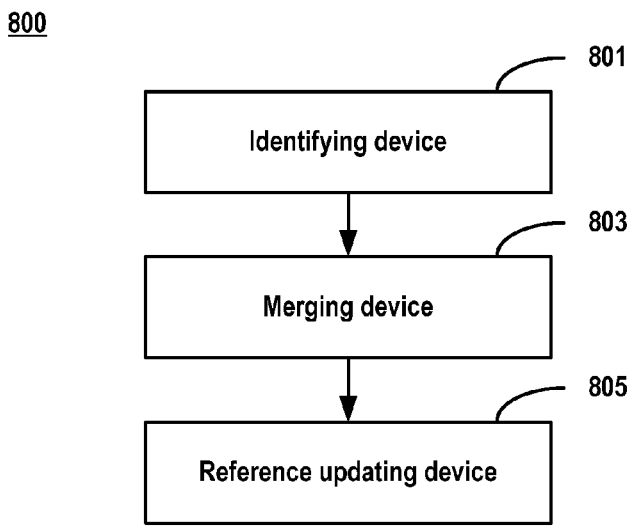
FIG. 8 shows a block diagram of a system for sharing application objects among multiple tenants according to the present invention.

FIG. 8 shows a system 800 for sharing application objects among multiple tenants. The system 800 comprises: an identifying device 801 configured to identify objects that can be shared by multiple tenants; a merging device 803 configured to merge the objects that can be shared by multiple tenants; and a reference updating device 805 configured to update references of the tenants to the shared objects prior to the merging, such that the references can point at a merged shared object. Specific implementations of the above devices have been depicted above in detail, which will not be detailed here.

Preferably, the objects that can be shared by multiple tenants are objects belonging to a same class and whose primitive-like type fields have identical contents but belonging to different tenants.

Preferably, the system 800 further comprises a filtering system configured to filter out candidate objects that can be shared by multiple tenants from among heap objects of the Java virtual machine.

Preferably, the identifying device comprises: a grouping device configured to group the candidate objects according to the tenants to which the candidate objects belong; and a group identifying device configured to identify the objects that can be shared by multiple tenants from among different candidate object groups.

Preferably, the identifying device comprises: a comparing device configured to compare the classes to which the objects in different candidate object groups belong and the values of their primitive-like type fields to determine whether the classes and the values of the primitive-like type fields are identical; and a determining device configured to in response to the belonged classes and the values of the primitive-like type fields being identical, determine that these objects are the objects that can be shared by multiple tenants.

Preferably, the identifying device comprises: a second comparing device configured to compare hash values of objects in different candidate object groups, wherein the hash values are obtained from the calculation based on the classes to which the objects belong and values of all primitive-like type fields, and are pre-stored in an object structure; and a second determining device configured to in response to the hash values of the objects in the different candidate object groups being identical, determine that these objects are the objects that can be shared by multiple tenants.

Preferably, the merging device comprises: a second merging device configured to merge the primitive-like type fields in the objects that can be shared by multiple tenants; a third comparing device configured to compare complex reference type fields in the objects that can be shared by multiple tenants; a third merging device configured to merge the complex reference type fields in response to the complex reference type fields in the objects that can be shared by multiple tenants pointing to a same address; and a marking device configured to otherwise mark the complex reference type fields in the objects that can be shared by multiple tenants as field values being only visible within tenant domains to which original objects comprising the fields belong.

Preferably, the candidate objects that can be shared by multiple tenants are objects that have experienced a sufficiently long time and are mainly composed of primitive-like type fields, wherein the primitive-like type fields are not modified within the sufficiently long time.

Preferably, the system 800 further comprises: a copying device configured to, in response to the tenant modifying most fields of the merged shared object, copy one new object based on the merged shared object; an updating device configured to update values of the most fields of the copied object; and a reference modifying device configured to change the reference of the tenant pointing at the merged shared object to be pointing at the copied object.

Preferably, the primitive-like type fields comprise at least one of the following: primitive data, an array of the primitive data, a package class of the primitive data, an array of package classes, and an invariable object.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sharing objects among multiple tenants, wherein the objects are application objects, and wherein the method comprises:
    identifying, by one or more processors, objects that can be shared by the multiple tenants;
    merging, by one or more processors, the objects that can be shared by the multiple tenants, wherein said merging the objects that can be shared by the multiple tenants comprises:
    merging, by one or more processors, primitive-like type fields in the objects that can be shared by the multiple tenants;
    comparing, by one or more processors, complex reference type fields in the objects that can be shared by the multiple tenants;
    in response to the complex reference type fields in the objects that can be shared by the multiple tenants pointing at different addresses, marking, by one or more processors, the complex reference type fields in the objects that can be shared by the multiple tenants as field values being only visible within tenant domains to which original objects comprising the fields belong;
    updating, by one or more processors, references of tenants to the shared objects prior to the merging so as to cause the references to point at a merged shared object;
    in response to a tenant modifying multiple fields of the merged shared object, copying, by one or more processors, a new object based on the merged shared object;

updating, by one or more processors, values of multiple fields of the copied object; and modifying, by one or more processors, the reference of the tenant pointing at the merged shared object to be pointing at the copied object.

2. The method according to claim 1, wherein the objects that can be shared by the multiple tenants are objects belonging to a same class and whose primitive-like type fields have identical contents but belong to different tenants.

3. The method according to claim 2, further comprising:
filtering out, by one or more processors, candidate objects that can be shared by the multiple tenants from among heap objects of a Java virtual machine.

4. The method according to claim 2, wherein the primitive-like type fields comprise at least one of a group consisting of: primitive data, an array of the primitive data, a package class of the primitive data, an array of package classes, and an invariable object.

5. The method according to claim 3, wherein said identifying objects that can be shared by the multiple tenants comprises:
grouping, by one or more processors, the candidate objects according to the tenants to which the candidate objects belong; and
identifying, by one or more processors, the objects that can be shared by the multiple tenants from among different candidate object groups.

6. The method according to claim 3, wherein the candidate objects that can be shared by the multiple tenants are objects that have experienced a predetermined length of time and are composed of the primitive-like type fields, wherein the primitive-like type fields were not modified within the predetermined length of time.

7. The method according to claim 5, wherein said identifying objects that can be shared by the multiple tenants comprises:
comparing, by one or more processors, classes to which the objects in the different candidate object groups belong and values of their primitive-like type fields to determine whether the belonged classes and the values of the primitive-like type fields are identical; and
in response to the belonged classes and the values of the primitive-like type fields being identical, determining, by one or more processors, that these objects are the objects that can be shared by the multiple tenants.

8. The method according to claim 5, wherein said identifying objects that can be shared by the multiple tenants comprises:
comparing, by one or more processors, hash values of the objects in the different candidate object groups, wherein the hash values are obtained from calculation based on the classes to which the objects belong and the values of all primitive-like type fields, and are pre-stored in an object structure; and
in response to the hash values of the objects in the different candidate object groups being identical, determining, by one or more processors, that these objects are the objects that can be shared by the multiple tenants.

9. A system for sharing objects among multiple tenants, wherein the objects are application objects, and wherein the system comprises:
an identifying hardware device configured to identify objects that can be shared by the multiple tenants;
a first merging hardware device configured to merge the objects that can be shared by the multiple tenants, wherein the first merging hardware device comprises:

a second merging hardware device configured to merge primitive-like type fields in the objects that can be shared by the multiple tenants;
a first comparing hardware device configured to compare complex reference type fields in the objects that can be shared by the multiple tenants; and
a third merging hardware device configured to, in response to the complex reference type fields in the objects that can be shared by the multiple tenants pointing at different addresses, mark the complex reference type fields in the objects that can be shared by the multiple tenants as field values being only visible within tenant domains to which original objects comprising the fields belong;
a reference updating hardware device configured to update references of tenants to the shared objects prior to the merging so as to cause the references to point at a merged shared object;
a copying hardware device configured to, in response to a tenant modifying multiple fields of the merged shared object, copy a new object based on the merged shared object;
an updating hardware device configured to update values of multiple fields of the copied object; and
a reference modifying hardware device configured to modify the reference of the tenant pointing at the merged shared object to be pointing at the copied object.

10. The system according to claim 9, wherein the objects that can be shared by the multiple tenants are objects belonging to a same class and whose primitive-like type fields have identical contents but belonging to different tenants, and wherein the primitive-like type fields comprise at least one of a group consisting of: primitive data, an array of the primitive data, a package class of the primitive data, an array of package classes, and an invariable object.

11. The system according to claim 10, further comprising:
a filtering hardware system configured to filter out candidate objects that can be shared by the multiple tenants from among heap objects of a Java virtual machine.

12. The system according to claim 11, wherein the identifying device comprises:
a grouping hardware device configured to group the candidate objects according to the tenants to which the candidate objects belong; and
a group identifying hardware device configured to identify the objects that can be shared by the multiple tenants from among different candidate object groups.

13. The system according to claim 11, wherein the candidate objects that can be shared by the multiple tenants are objects that have experienced a sufficiently long time and are mainly composed of the primitive-like type fields, wherein the primitive-like type fields were not modified within the sufficiently long time.

14. The system according to claim 12, wherein the identifying hardware device comprises:
a second comparing hardware device configured to compare classes to which the objects in the different candidate object groups belong and values of their primitive-like type fields to determine whether the belonged classes and the values of the primitive-like type fields are identical; and
a determining hardware device configured to, in response to the belonged classes and the values of the primitive-like type fields being identical, determine that these objects are the objects that can be shared by the multiple tenants.

15. The system according to claim 12, wherein the identifying hardware device comprises:

a second comparing hardware device configured to compare hash values of the objects in the different candidate object groups, wherein the hash values are obtained from calculation based on the classes to which the objects belong and the values of all primitive-like type fields, and are pre-stored in an object structure; and a determining hardware device configured to, in response to the hash values of the objects in the different candidate object groups being identical, determine that these objects are the objects that can be shared by the multiple tenants.

16. A computer program product for sharing objects among multiple tenants, wherein the objects are application objects, and wherein the computer program product comprises a non-transitory computer readable storage medium having program code embodied therewith, the program code readable and executable by a processor to perform a method comprising:

identifying objects that can be shared by the multiple tenants;

merging the objects that can be shared by the multiple tenants, wherein said merging the objects that can be shared by the multiple tenants comprises:

merging primitive-like type fields in the objects that can be shared by the multiple tenants;

comparing complex reference type fields in the objects that can be shared by the multiple tenants;

in response to the complex reference type fields in the objects that can be shared by the multiple tenants pointing at different addresses, marking, by one or more processors, the complex reference type fields in the objects that can be shared by the multiple tenants as field values being only visible within tenant domains to which original objects comprising the fields belong;

updating references of tenants to the shared objects prior to the merging so as to cause the references to point at a merged shared object;

in response to a tenant modifying multiple fields of the merged shared object, copying a new object based on the merged shared object;

updating values of multiple fields of the copied object; and modifying the reference of the tenant pointing at the merged shared object to be pointing at the copied object.

\* \* \* \* \*